US008314682B2

(12) United States Patent
Bringer et al.

(10) Patent No.: US 8,314,682 B2
(45) Date of Patent: Nov. 20, 2012

(54) PROCESSING BIOMETRIC DATA IN A MULTIDIMENSIONAL COORDINATE SYSTEM

(75) Inventors: Julien Bringer, Paris (FR); Herve Chabanne, Mantes la Jolie (FR); Martin Cottard, Paris (FR)

(73) Assignee: Morpho, Paris (FR)

( * ) Notice: Subject to any disclaimer, the term of this patent is extended or adjusted under 35 U.S.C. 154(b) by 1000 days.

(21) Appl. No.: 12/294,608

(22) PCT Filed: Mar. 20, 2007

(86) PCT No.: PCT/FR2007/000471
§ 371 (c)(1),
(2), (4) Date: Sep. 25, 2008

(87) PCT Pub. No.: WO2007/110498
PCT Pub. Date: Oct. 4, 2007

(65) Prior Publication Data
US 2009/0231096 A1 Sep. 17, 2009

(30) Foreign Application Priority Data
Mar. 29, 2006 (FR) ...................................... 06 02724

(51) Int. Cl.
*G05B 19/00* (2006.01)
(52) U.S. Cl. ....... 340/5.82; 340/5.52; 713/168; 713/186
(58) Field of Classification Search ................. 340/5.82, 340/5.52; 380/44, 28–30; 713/186, 182, 713/168, 161
See application file for complete search history.

(56) References Cited

U.S. PATENT DOCUMENTS
6,219,794 B1* 4/2001 Soutar et al. .................... 726/18
(Continued)

FOREIGN PATENT DOCUMENTS
EP 0 827 284 A1 3/1998

OTHER PUBLICATIONS
Berrou et al., "Near Shannon Limit Error—Correcting Coding and Decoding: Turbo-Codes(1)," *Proceedings of the International Conference on Communications*, 3: 1064-1070 (1993).

(Continued)

*Primary Examiner* — Albert Wong
*Assistant Examiner* — Peter Mehravar
(74) *Attorney, Agent, or Firm* — Marshall, Gerstein & Borun LLP

(57) ABSTRACT

The invention concerns a biometric system provided with a set of reference biometric data (B'i) resulting from the application of a disjunction between a first set of biometric data (Bi) and a first encoded key (Ki), and from an information concerning the first key. A second set of biometric data (B2) is obtained. A second encoded key is determined by using a disjunction between the set of reference biometric data and the second set of biometric data. The second key is decoded by iterative decoding. Then, it is determined whether the first and second sets of biometric data mutually correspond by comparing the information concerning the first key with the second key. The first and second sets of biometric data are expressed in a multidimensional repository with N dimensions, the biometric data according to at least one of the N dimensions being obtained by using processes relative to the biometric part; and the first encoded key is obtained by using an encoding transforming an initial word of specific length into an encoded word in the multidimensional repository.

12 Claims, 3 Drawing Sheets

U.S. PATENT DOCUMENTS

| | | | | |
|---|---|---|---|---|
| 6,330,345 | B1 | 12/2001 | Russo et al. | |
| 7,203,343 | B2 * | 4/2007 | Manasse et al. | 382/115 |
| 7,287,164 | B2 * | 10/2007 | Carro | 713/176 |
| 7,802,105 | B2 * | 9/2010 | Chmora et al. | 713/186 |
| 2005/0180620 | A1 * | 8/2005 | Takiguchi | 382/128 |

OTHER PUBLICATIONS

Daugman, "Complete Discrete 2-D Gabor Transforms by Neural Networks for Image Analysis and Compression," *IEEE Trans. on Acoustics, Speech and Signal Proc.*, 36(7):1169-1179 (1169).

Daugman, "High Confidence Visual Recognition of Persons by a Test of Statistical Independence," *IEEE Trans. on Pattern Analysis and Machine Intell.*, 15(11):1148-1161 (1993).

Daugman, "The Importance of Being Random: Statistical Principles of Iris Recognition," *Pattern Recognition*, 36:279-291 (2003).

Forney, "The Viterbi Algorithm," *Proceedings of the IEEE*, 61(3):268-278 (1973).

Hao et al., "Combining Cryptography with Biometrics Effectively," *Technical Report No. 640*, pp. 1-17 (2005).

Horton et al., "The Costs and Benefits of Using Complex 2-D Gabor Filters in a Filter-Based Fingerprint-Matching System," *Proceedings of the 34th Southeastern Symposium on System Theory*, pp. 171-175 (2002).

Jain et al., A Multichannel Approach to Fingerprint Classification, *IEEE Trans. Pattern Anal. and Machine Intell.*, pp. 1-28 (1999).

Juels et al., "A Fuzzy Commitment Scheme," Proceedings of the 6th ACM Conference on Computer and Communications Security, pp. 28-36 (1999).

International Search Report for Application No. PCT/FR2007/000471, dated Jul. 27, 2007.

* cited by examiner

PROCESSING BIOMETRIC DATA IN A MULTIDIMENSIONAL COORDINATE SYSTEM

FIELD OF INVENTION

The present invention relates to the processing of biometric data, and more particularly the recognition of biometric data on the database stored in memory.

BACKGROUND OF THE INVENTION

Some systems of access control are based on an analysis of biometric characteristics of a person to determine, for example, whether the latter is authorized to access a protected place. Such an analysis of biometric characteristics is also used in some authentication or identification systems that aim to authenticate or identify a person. Such an analysis is conventionally based on a comparison of biometric data captured about a person in the course of a check with data stored in a database.

Thus, for example, in the case of access control systems, biometric data corresponding to people for whom access is authorized are stored in a database. At the end of a step of comparing data captured about a person in the course of a check with stored data, the system is able to determine whether this person belongs to those for whom access is authorized.

In this type of biometric system, this comparison step is a key step on which the reliability of the system rests.

The document "A Fuzzy Commitment Scheme" by Juels and Wattenberg 1999 proposes transforming this comparison step into a conventional decoding problem. Previously stored biometric data b1 are compared with biometric data b2 about a person captured in the course of a check. To this end, this document proposes applying an "exclusive or" operation to the biometric data b1 of these data with an error correcting code c. Hence coded biometric data f are obtained. Then, to compare the captured biometric data b2 with the biometric data b1, it is determined whether the following operation is satisfied:

$$f \oplus b2 = c \oplus e$$

in which e is an error having a weight lower than the correction capacity of the code.

In the case in which this equation is satisfied, it is deduced from this that the stored biometric data b1 and the captured biometric data b2 correspond to each other.

The document "Combining Cryptography with Biometrics Effectively" by Hao Anderson and Daugman, 2005, proposes applying this general principle consisting in using an error correcting code in a comparison step of a biometric system, in the specific case of biometric data corresponding to an iris. Biometric data relating to the iris are encoded over 256 octets, hence forming an iris code. First, an iris code B is determined for use as a reference datum. A biometric key K is generated by a random number generator. This biometric key K is then encoded with a correcting code coming from a Reed-Solomon code and from a Hadamard code to provide a pseudo iris code K'.

The "exclusive or" operation is then applied between the pseudo iris code K' and the iris code B representing the reference datum to provide a result R that satisfies the following equation:

$$R = B \oplus K'$$

The result R of this latter operation is then stored along with the biometric key in a hashed form H(K).

Then, when a person is being checked, biometric data from his/her iris are captured in the form of a captured iris code B'.

The "exclusive or" operation is then applied between the stored result R and this captured iris code B' to obtain the following result R':

$$R' = B' \oplus R$$

Next, the result R' is decoded based on the correcting code previously used to encode the biometric key K in order to produce a biometric key C.

The same hash function is then applied to the biometric key C hence obtained and the biometric key stored in its hashed form H(K) is compared with the biometric key C in its hashed form H(C).

If the following equation is satisfied:

$$H(K) = H(C)$$

it is deduced from this that the captured biometric data correspond to the reference datum.

Biometric data are represented here by an iris code having a size limited to 256 octets.

This iris code is obtained by processing an iris image. Now, such an image may have different characteristics depending on the context in which it has been captured, and especially depending on the exposure of the iris to light at the moment the image is captured or again depending on the movement of the person during capture of the iris image.

Various processes enable the different potential disturbances that can affect such an image to be smoothened.

Thus, for example, it is possible to apply various image processing filters so as to obtain a plurality of respective levels of information relating to the same image, thus enabling the information relating to the iris being processed to be enriched.

In order to smooth the disturbances to the iris image capture, it is also possible to carry out a plurality of iris image captures. In this case, the information relating to the iris is also multiplied and different levels of information are obtained.

Each of these information levels may then correspond, in the context of the document "Combining Cryptography with Biometrics Effectively", to an iris code encoded over 256 octets. To process this plurality of information levels, it is then possible to apply successively the method described in the previously mentioned document in relation to the various information levels. Hence, the comparison step would then consist in successively comparing the iris codes B with iris codes B', each resulting from the application of one filter from a plurality of filters considered or again resulting from one image capture from a plurality of image captures carried out.

Such a comparison step would therefore correspond to a plurality of comparison steps based on data from 256 octets, each having a limited reliability level.

OBJECTS OF THE INVENTION

The present invention aims to improve the reliability level of such a comparison step.

An objective of the present invention aims to improve the performance of processing of biometric data based on a comparison of a first set of biometric data with a second set of biometric data to determine whether these first and second sets of biometric data belong to the same person.

More precisely, it is proposed to carry out the step of comparing biometric data according to a method that enables biometric data represented in a multidimensional coordinate system to be processed so as to take into account simultaneously, in the course of a single comparison step, biometric data obtained by a plurality of processes applied in relation to the biometric part considered, these processes possibly being, for example, applications of a plurality of filters or again of image captures of this biometric part. In this way, the reliability level of such a comparison step can be improved.

SUMMARY OF THE INVENTION

A first aspect of the present invention proposes a method of processing biometric data relating to a biological part, in a biometric system having, on the one hand, at least one set of reference biometric data resulting from the application of an "exclusive or" operation between a first set of biometric data and a first encoded key and, on the other hand, a piece of information relating to the first key.

The method comprises the following steps:

(a) obtaining a second set of biometric data;
(b) determining a second encoded key by applying an "exclusive or" operation between the set of reference biometric data and the second set of biometric data;
(c) decoding the second key; and
(d) deciding whether the second set of biometric data corresponds to the first set of biometric data by comparing the information relating to the first key with the second key.

The first and second sets of biometric data are expressed in a multidimensional coordinate system of N dimensions, N being an integer greater than or equal to 2, the biometric data along at least one of the N dimensions being obtained by applying a plurality of processes applied in relation to the biological part.

Furthermore, the first encoded key is obtained by applying an encoding transforming an initial word of a predetermined length into a word coded in the multidimensional coordinate system.

Thanks to these provisions, the biometric data manipulated can be expressed in a multidimensional coordinate system, thus advantageously enabling a large quantity of data relating to the biometric data processed to be taken into account, and therefore enabling the efficiency and the reliability of this type of method of biometric processing to be improved.

Indeed, the greater the quantity of relevant information simultaneously processed, the higher the reliability level associated with the comparison of biometric data captured about a person in the course of a check with initially stored biometric data.

No limitation is attached to the type of the plurality of processes applied in relation to the biometric part.

As the data are manipulated in a multidimensional coordinate system, it is possible here to consider simultaneously biometric data relating to an image processed, for example, according to a first filter and biometric data relating to an image processed according to at least one second filter, these filters being filters of the same type that belong to the same family of filters.

It is also possible here to provide for processing a plurality of families of filters. In this case, each family of additional filters may then lead to an additional dimension in the multidimensional coordinate system of N dimensions.

Hence, in one embodiment of the present invention, the biometric data along at least one dimension are obtained by applying a plurality of filters to an image of the biometric part.

It is also possible to consider simultaneously biometric data coming from different image captures of the biometric part considered.

Thus, in one embodiment of the present invention, the biometric data along at least one dimension are obtained by capturing a plurality of images of the biometric part.

In a variant, the multidimensional coordinate system considered includes at least one dimension relating to the plurality of image captures carried out for the biometric part considered and at least one other dimension relating to the application of a plurality of filters applied to the plurality of captured images.

It is also possible to provide advantageously for at least one dimension of the multidimensional coordinate system according to an embodiment of the present invention to correspond to biometric data obtained by varying at least one feature conditioning the context of the image capture. Hence, one dimension may correspond, through image capture, to a plurality of luminosity values, or a plurality of contrast values, or again to a variation in the color level histogram.

It is also possible to consider biometric data along at least one dimension obtained from a captured image by varying a threshold for quantifying digital writing of the captured image.

In a variant, it is possible to provide for a combination of all these pluralities of processes to be taken into account, the number of dimensions of the multidimensional coordinate system depending directly on this.

Such a method can be advantageously employed in any biometric system based on a step of comparison between first and second biometric data intended to determine whether these first and second biometric data belong to the same person.

In one embodiment of the present invention, the multidimensional coordinate system comprises data of length $n_i$ along each of the N dimensions of the coordinate system, i being between 1 and N. The encoding of the first key may then comprise the following steps:

transforming the first key into another N-dimensional coordinate system comprising data of respective length $k_i$ along the N dimensions, the product of the lengths $k_i$, for i between 1 and N, being equal to the predetermined length of the first key; and successively applying N codes in block $C_i$ along the N dimensions respectively, transforming the data of respective length $k_i$ into coded data of respective length $n_i$.

The information relating to the first key may be obtained by applying a hash function to the first key. In this case, step (d) may include the following steps:

applying the hash function to the second key; and
comparing the second key in hashed form with the information relating to the first key.

A second aspect of the present invention proposes a device for processing biometric data relating to a biological part in a biometric system, the processing device having, on the one hand, at least one set of reference biometric data resulting from the application of an "exclusive or" operation between a first set of biometric data and a first encoded key and, on the other hand, a piece of information relating to the first key.

The device may comprise:

an interface unit designed to receive a second set of biometric data;
a determination unit designed to provide a second encoded key by applying an "exclusive or" operation between the set of reference biometric data and the second set of biometric data received by said interface unit;
a decoding unit designed to decode the second encoded key; and a decision unit designed to decide whether the second set of biometric data corresponds to the first set of biometric data by comparing the information relating to the first key with the second key.

The first and second sets of biometric data may be expressed in a multidimensional coordinate system of N dimensions, N being an integer greater than or equal to 2, the biometric data along at least one of said N dimensions being obtained by applying a plurality of processes applied in relation to the biological part.

The first encoded key may be obtained by applying an encoding transforming an initial word of a predetermined length into a word coded in the multidimensional coordinate system.

The biometric data along at least one dimension may be obtained by capturing a plurality of images of the biological part.

The biometric data along at least one dimension may also be obtained by applying a plurality of filters to an image of the biological part.

The information relating to the first key may be obtained by applying a hash function to the first key; and the decision unit may then comprise:

a hashing unit designed to apply the hash function to the decoded second key; and a comparison unit designed to compare the information relating to the first key and the second key in hashed form.

The set of reference biometric data and/or the information relating to the first key may be available in a database.

A third aspect of the present invention proposes a system for processing biometric data comprising a biometric data processing device according to the second aspect of the present invention and at least one biometric sensor designed to provide a second set of biometric data to said biometric data processing device.

Other aspects, aims and advantages of the invention will become apparent on reading the description of one of its embodiments.

BRIEF DESCRIPTION OF THE DRAWINGS

The invention will also be better understood with the help of the drawings, in which.

DETAILED DESCRIOTION OF THE PREFERRED EMBODIMENT

Figure 1:
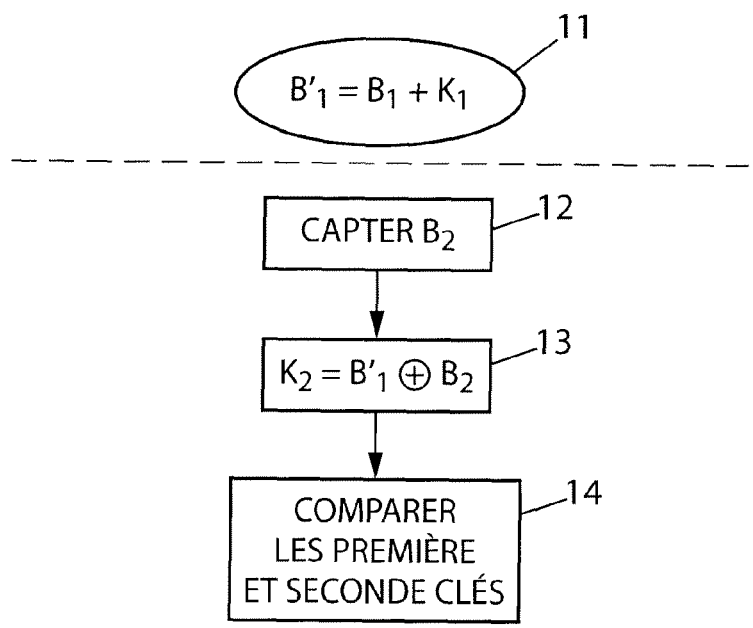
FIG. 1 illustrates the main steps carried out according to an embodiment of the present invention.

FIG. 1 illustrates the main steps carried out according to an embodiment of the present invention.

In an initialization step 11, the biometric system considered has a set of reference biometric data $B'_1$. This set of biometric data satisfies the following equation:

$$B'_1 = B_1 + K_1$$

where $B_1$ corresponds to a first set of biometric data; and $K_1$ corresponds to a first encoded key.

The first set of biometric data may be obtained in a conventional initialization phase for a biometric system of this type, in the course of which biometric data corresponding to the people considered in the biometric system are captured, i.e. the people for whom access is authorized, or identification is possible, or again authentication is possible.

In one embodiment of the present invention, this first set of biometric data may relate to a biological part corresponding to a fingerprint or to an iris. The captured biometric data correspond in these examples to a two-dimensional (2D) image. This first set of biometric data may also relate to a face and hence correspond either to a 2D image or to a three-dimensional (3D) image.

In the case in which a set of biometric data to be processed corresponds to a 2D image, and when this image is filtered according to two distinct families of filters $f_i$ and $g_i$, then the corresponding biometric data are hence advantageously manipulated and processed according to an embodiment of the present invention in a four-dimensional coordinate system.

In a variant, a single family of filters is used. Here the biometric data are hence advantageously processed in a 3D coordinate system.

It is then easy to deduce from the examples set out above a general principle which is suited to biometric data captured along X dimensions and respectively filtered with a number Y of families of image filters. In this latter case, the biometric data are advantageously processed in an N-dimensional coordinate system, with N satisfying the following equation:

$$N = X + Y$$

Whichever biological part is intended (iris, print, face) in an embodiment of the present invention, the image considered is processed according to at least one family of filters designed for the intended biological part. Such a feature enables improvement of the performance of such a biometric system by increasing the reliability level of the decision-making based on the step of comparing biometric data according to an embodiment of the present invention.

In this context, the first set of biometric data $B_1$ corresponds to data located in a multidimensional coordinate system, at least one dimension of which relates to the application of a family of filters to an image of the intended biological part.

In the case in which the biometric data relating to the intended biological part are expressed along one dimension, in the form of a word of $n_1$ bits, $n_1$ being an integer, such as an iris code such as previously described, it is possible to apply a method according to an embodiment in a two-dimensional coordinate system, a first dimension corresponding to the $n_1$ bits of the word encoding the intended biological part and a second dimension corresponding to the application of a family of filters to this intended biological part.

Here a set of biometric data can therefore be written in the form of a matrix of $n_1$ columns and $n_2$ rows, $n_2$ corresponding to the number of filters included in the family of filters applied to the image of the intended biological part.

The first encoded key $K_1$, applied at this step 11, may advantageously be obtained by first randomly generating a first key of k bits and by applying an encoding to these k bits which is designed to fit from a coordinate system defined over one dimension and over a length k to said multidimensional coordinate system.

A code from the Turbo Codes family may be suited to this embodiment. Such codes are described, for example, in the document EP 827284 "Information bits transmission process with error correction coding, and coder and decoder for implementing said process". The following sections describe an example of the application of such a Turbo Code in an embodiment of the present invention applied to a two-dimensional coordinate system. From this it is straightforward to deduce an application to a multidimensional coordinate system with N dimensions, N being any number greater than 2.

More precisely, the following sections describe an example of a Turbo Code Product (TCP) based on a product of two codes C1 and C2 with the parameters $(n_1, k_1, d_1)$ and $(n_2, k_2, d_2)$ respectively, where $n_i$ (i between 1 and 2) corresponds to the length of the code $C_i$, $k_i$ corresponds to the number of information symbols of the code $C_i$, and $d_i$ corresponds to the minimum Hamming distance between any two words.

Figure 2:
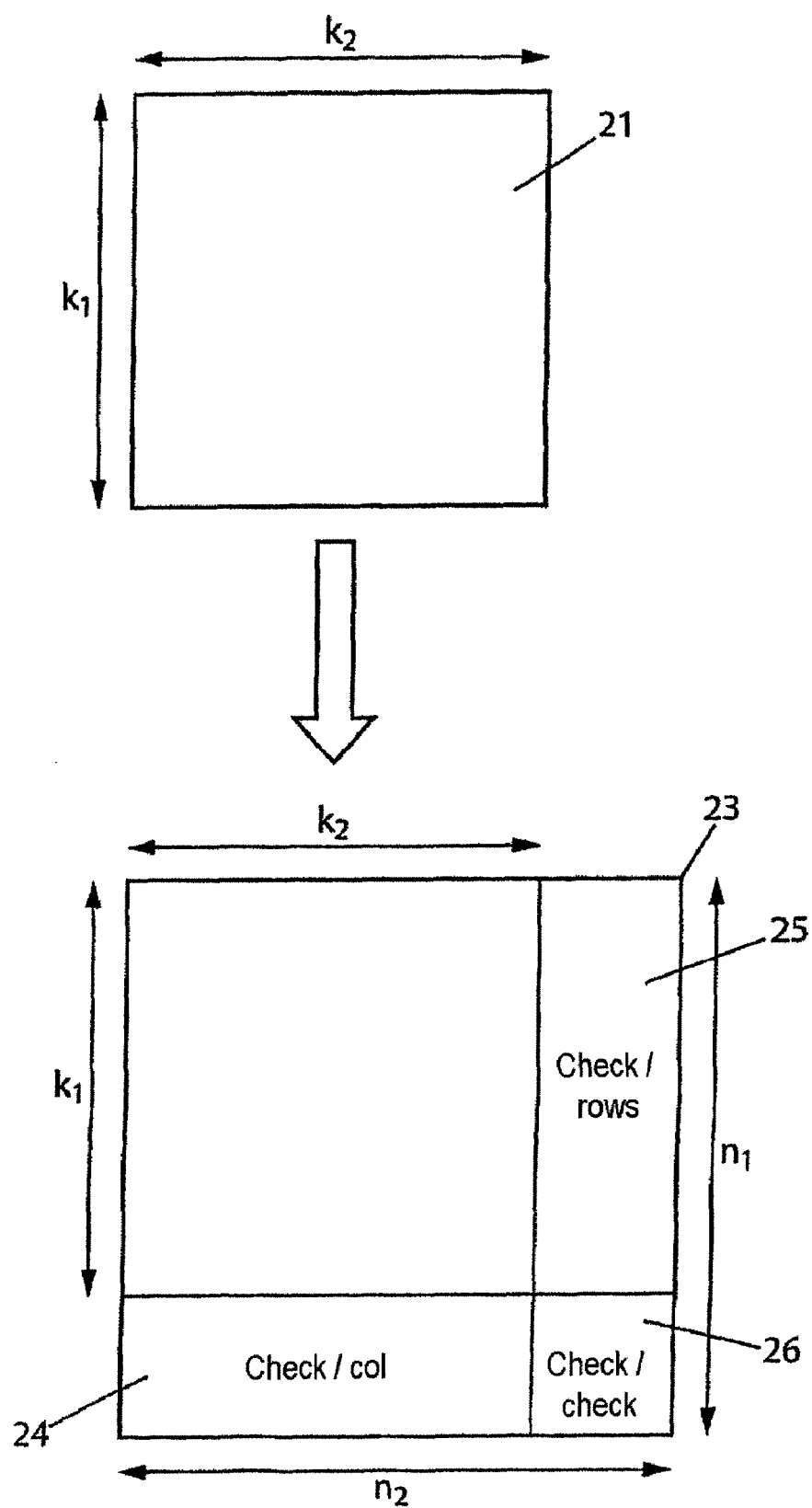
FIG. 2 illustrates the application of an encoding according to an embodiment of the present invention.

FIG. 2 illustrates the application of such a Turbo Code to the key of k bits to obtain the first encoded key $K_1$. The first key of k bits is first written in the form of a matrix 21 comprising $k_1$ rows and $k_2$ columns of elements, each corresponding to one bit of the first key, $k_1$ and $k_2$ satisfying the following equation:

$$k_1 \times k_2 = k$$

The $k_1$ rows are then each encoded with the code $C_2$, providing $k_1$ rows of $n_2$ elements. Thus a matrix of $k_1 \times n_2$ elements is obtained. Next, the $n_2$ columns of this matrix are encoded with the code $C_1$, providing $n_2$ columns of $n_1$ elements is obtained. After applying the Turbo Code based on the block codes C1 and C2, a matrix 23 of $n_1 \times n_2$ elements is thus obtained. Generally, in such a matrix, one part 24 comprises elements for checking the columns allowing the validity of the $k_1$ first elements of the $k_2$ first columns of this matrix 23 to be checked. This latter also comprises a part 25 of elements for checking the rows allowing the validity of the $k_2$ first elements of the $k_1$ first rows of this matrix to be checked, a part 26 allowing the elements for checking the rows and the columns of parts 25 and 24 respectively to be checked.

Hence, by applying such an encoding to the key of k bits, an encoded key $K_1$ of size $n_1 \times n_2$ is obtained.

In such conditions, the biometric system has a set of reference biometric data which results from the application of an "exclusive or" between the first set of biometric data $B_1$ and the first encoded key $K_1$, $B_1$ and $K_1$ being expressed in the same multidimensional coordinate system.

The method according to an embodiment of the present invention hence consists, in a step 12, in capturing a second set of biometric data $B_2$, for example from a person in the course of a check, in the biometric system considered.

Then, in a step 13, a second encoded key $K_2$ is obtained which satisfies the following equation:

$$K_2 = B'_1 \oplus B_2$$

This last equation can be written in the following form:

$$K_2 = B_1 \oplus B_2 \oplus K_1$$

In the case in which the two sets of biometric data $B_1$ and $B_2$ correspond to the same biological part of the same person, the keys $K_1$ and $K_2$ should also correspond to each other to within an error.

By decoding the second encoded key $K_2$, through application of a decoding corresponding to the encoding applied to the first key to obtain $K_1$, a second key is obtained. On the basis of a comparison between the first key and the second key, it is hence possible to determine whether the first and second sets of biometric data correspond to the same person.

The decoding of a datum thus encoded may rest on an iterative process that consists in carrying out a decoding of rows followed by a decoding of columns. A decoding of this type may, for example, be based on a Viterbi algorithm such as described in the document G. D. Forney "The Viterbi Algorithm", *Proc. IEEE*, vol. 61, no. 3, pp. 268-278, March 1973. A decoding of this type may also be similar to that employed in a "Turbo Decoder" as proposed in the document EP 827284. In the case in which the input data of such a decoder are binary, the decoding amounts to finding the codeword with the minimum Hamming distance. This type of iterative decoding is well known to the person skilled in the art and enables a high level of performance to be attained.

Such a decoding consists in iteratively carrying out a decoding of the rows and a decoding of the columns.

Given that such a comparison step is based on simultaneous processing of a large quantity of information that comprises in particular data resulting from the application of a plurality of filters to an image of the biological part considered, this step is efficient and highly reliable.

The application of filters to an intended biological part enables resistance to the variations and/or disturbances that might, to a greater or lesser extent, affect the data capture steps in the course of such a method to be improved.

In one embodiment of the present invention, one set of biometric data corresponds to a capture of the iris of a person according to a method such as that proposed in the document J. Daugman, "High Confidence Visual Recognition of Persons by a Test of Statistical Independence", IEEE Trans. Pattern Anal. Mach. Intell. 15(11)(1993), 1148-1161, and in the document J. Daugman, "The Importance of being Random: Statistical Principles of Iris Recognition", Pattern Recognition, vol. 36, no. 2, pp. 279-291, 2003.

It should be noted that an embodiment of the present invention can easily be applied to any biometric part other than the iris. The sections describe an example of image processing based on an application of filters set out here solely by way of illustration.

An iris is captured here in the form of an infrared image. This image is then filtered according to a family of 2D Gabor filters, such as those defined, for example, in the document J. G. Gaugman, "Complete Discrete 2D Gabor Transforms by Neural Networks for Image Analysis and Compression", IEEE Trans. Acoustics; Speech Signal Processing 36 (1988).

The infrared image is processed along two dimensions, for example following, on the one hand, concentric circles and, on the other hand, the radii of these circles. Hence, in such conditions, the coordinate system used for the sets of biometric data is a three-dimensional coordinate system, corresponding to the two dimensions of image processing and to the dimension of the family of filters used.

In a variant, when the intended biological part corresponds to captured fingerprints in the form of a 2D image, it is possible to apply a method such as that proposed in the document K. Jain, S. Prabhakar, and L. Hong, "A Multichannel Approach to Fingerprint Classification", IEEE Trans. Pattern Anal. and Machine Intell., vol. 21, no. 4, pp. 348-359, 1999.

Figure 3:
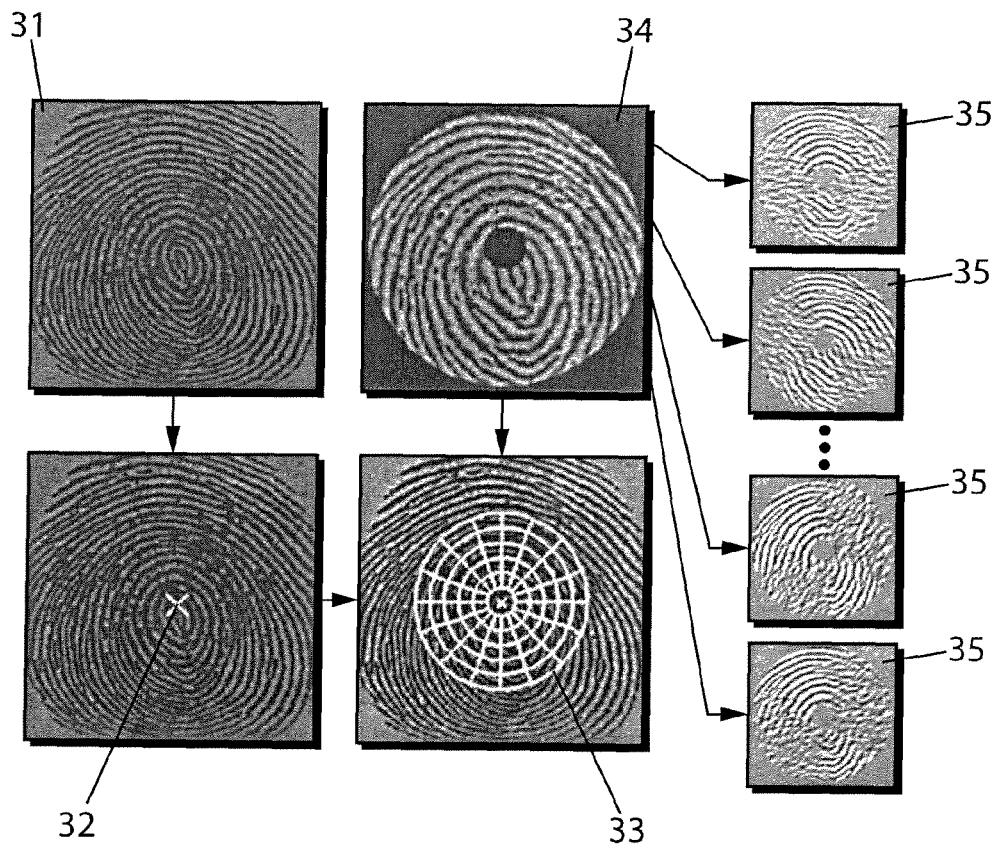
FIG. 3 illustrates the application of a family of filters to a fingerprint.

FIG. 3 illustrates such a method. A fingerprint image 31 is captured. A reference point 32 is then located in this image. Next, starting from this reference point 32, the image is divided into a plurality of angular sectors. The sectors thus defined are then normalized, as illustrated by an image 34 before a family of filters is respectively applied along different directions, as illustrated by images 35.

The image is then processed, on the one hand, along two dimensions, and, on the other hand, according to a family of filters. From this it results, in this case too, that the sets of biometric data are advantageously processed in a three-dimensional coordinate system according to an embodiment of the present invention.

Figure 4:
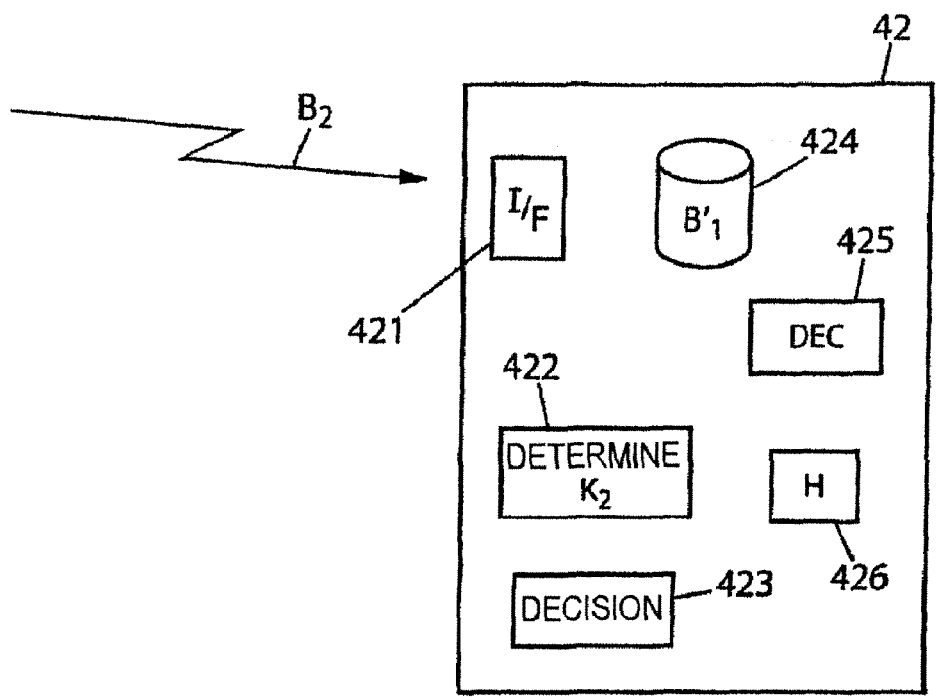
FIG. 4 illustrates a biometric data processing device according to an embodiment of the present invention.

FIG. 4 illustrates a biometric data processing device designed to implement an embodiment of the present invention.

Such a processing device 42 comprises an interface unit 421 designed to receive a second set of biometric data $B_2$. This second set of biometric data may, for example, be transmitted from a biometric sensor of the system considered.

This processing device 42 furthermore comprises a determination unit 422 designed to provide a second encoded key $K_2$ by applying an "exclusive or" operation between the set of reference biometric data and a second set of biometric data received by the interface unit 421.

It also comprises a decision unit 423 designed to decide whether the second set of biometric data $B_2$ corresponds to the first set of biometric data $B_1$ by comparing the information relating to the first key with the second key.

This comparison may be carried out on hashed forms of the first and second keys, which allows the confidentiality of these keys to be preserved. In fact, in this context, the first key is stored only in a hashed form.

In one embodiment of the present invention, the decision unit furthermore comprises a decoding unit 425 designed to decode the second encoded key $K_2$ by applying an iterative decoding corresponding to the encoding used to obtain the first key $K_1$.

It may furthermore comprise a hashing unit 426 designed to apply the hash function to the second decoded key.

The set of reference biometric data $B'_1$ and/or the first key in hashed form may be available in a database 424 managed by the processing device 42.

Figure 5:
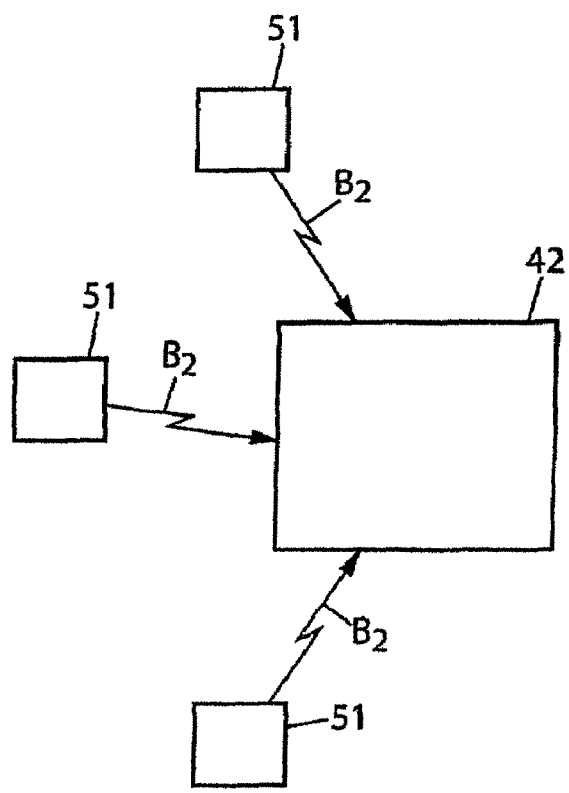
FIG. 5 illustrates a biometric data processing system according to an embodiment of the present invention.

FIG. 5 illustrates a biometric data processing system comprising a biometric data processing device 42 and a plurality of biometric sensors 51 designed to provide a second set of biometric data $B_2$ to this device 42.

The invention claimed is:

1. A method of processing biometric data relating to a biological part, in a biometric system having (1) at least one set of reference biometric data resulting from the application of an "exclusive or" operation between a first set of biometric data and a first encoded key and (2) a piece of information relating to the first key;
    said method comprising the following steps:
    (a) obtaining a second set of biometric data;
    (b) determining a second encoded key by applying an "exclusive or" operation between the set of reference biometric data and the second set of biometric data;
    (c) decoding said second key; and
    (d) deciding whether the second set of biometric data corresponds to the first set of biometric data by comparing the information relating to the first key with the second key;
    wherein said first and second sets of biometric data are expressed in a multidimensional coordinate system of N dimensions, N being an integer greater than or equal to 2, the biometric data along at least one of said N dimensions being obtained by a plurality of processes applied in relation to said biological part; and
    wherein said first encoded key is obtained by applying an encoding transforming an initial word of a predetermined length into a word coded in said multidimensional coordinate system.

2. The method of processing biometric data as claimed in claim 1, wherein the biometric data along at least one dimension are obtained by capturing a plurality of images of the biological part.

3. The method of processing biometric data as claimed in claim 1, wherein the biometric data along at least one dimension are obtained by applying a plurality of filters to an image of the biological part.

4. The method of processing biometric data as claimed in claim 1, wherein an iterative decoding is employed to carry out step (c).

5. The method of processing biometric data as claimed in claim 1, wherein the multidimensional coordinate system comprises data of length $n_i$ along each of the N dimensions of the coordinate system, i being between 1 and N; and
    wherein the encoding of the first key comprises the following steps:
    transforming the first key into another N-dimensional coordinate system comprising data of respective length $k_i$ along the N dimensions, the product of the lengths $k_i$ for i between 1 and N, being equal to the predetermined length of the first key; and
    successively applying N codes in block $C_i$ along the N dimensions respectively, transforming the data of respective length $k_i$ into coded data of respective length $n_i$.

6. The method of processing biometric data as claimed in claim 1, wherein the information relating to the first key is obtained by applying a hash function to the first key, and
    wherein step (d) includes the following steps:
    applying the hash function to the second key; and
    comparing the second key in hashed form with the information relating to the first key.

7. A device for processing biometric data relating to a biological part in a biometric system, said processing device having, on the one hand, at least one set of reference biometric data resulting from the application of an "exclusive or" operation between a first set of biometric data and a first encoded key and, on the other hand, a piece of information relating to the first key;
    said device comprising:
    an interface unit designed to receive a second set of biometric data;
    a determination unit designed to provide a second encoded key by applying an "exclusive or" operation between the set of reference biometric data and the second set of biometric data received by said interface unit;
    a decoding unit designed to decode the second encoded key; and
    a decision unit designed to decide whether the second set of biometric data corresponds to the first set of biometric data by comparing the information relating to the first key with the second key;
    wherein said first and second sets of biometric data are expressed in a multidimensional coordinate system of N dimensions, N being an integer greater than or equal to 2, the biometric data along at least one of said N dimensions being obtained by a plurality of processes applied in relation to said biological part; and
    wherein said first encoded key is obtained by applying an encoding transforming an initial word of a predetermined length into a word coded in said multidimensional coordinate system.

8. The biometric data processing device as claimed in claim 7, wherein the biometric data along at least one dimension are obtained by capturing a plurality of images of the biological part.

9. The biometric data processing device as claimed in claim 7, wherein the biometric data along at least one dimension are obtained by applying a plurality of filters to an image of the biological part.

10. The biometric data processing device as claimed in claim 7, wherein the information relating to the first key may be obtained by applying a hash function to the first key; and wherein the decision unit comprises:

a hashing unit designed to apply the hash function to the decoded second key; and a comparison unit designed to compare the information relating to the first key and the second key in hashed form.

11. The biometric data processing device as claimed in claim 7, wherein the set of reference biometric data and/or the information relating to the first key are available in a database.

12. A system for processing biometric data comprising a biometric data processing device as claimed in claim 7 and at least one biometric sensor designed to provide a second set of biometric data to said biometric data processing device.

* * * * *